United States Patent Office 2,981,636
Patented Apr. 25, 1961

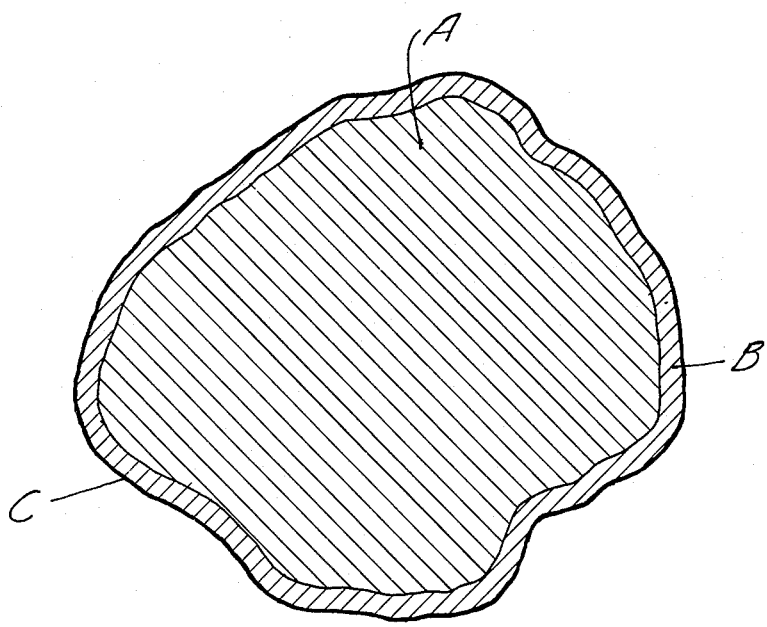
A - Base granule.
B - Silicate coating.
C - Pigmented surface.

2,981,636

COLORED ROOFING GRANULES

James R. Lodge, George W. Swenson, and Donald L. Reichel, St. Paul, Minn., assignors to Minnesota Mining and Manufacturing Company, St. Paul, Minn., a corporation of Delaware Filed Feb. 18, 1957, Ser. No. 640,604

14 Claims. (Cl. 117—70)

This application is a continuation-in-part of our application Serial No. 238,188, filed July 23, 1951, and now abandoned.

This invention relates to coated granular material and to an improved method for applying colored coatings to mineral granules used in surfacing asphalt-coated roofing or siding. The invention also has utility in the coating of asbestos-cement shingles.

Methods have long been known for the artificial coloring of roofing granules, consisting of crushed and screened minerals, in which the granules are coated with a suitable pigment in an inorganic bond. The bond is usually applied in the form of a soluble silicate solution and is insolubilized by heat treatment or by chemical action to a substantially water-insoluble state and is strongly adherent to the base granule. In carrying out these methods the pigment is uniformly applied to the granule surface with the soluble silicate solution.

The soluble silicate binder is converted to an insoluble state by heat treatment or by chemical action as by the addition of an acidic material to the soluble silicate, either before, during or after the application of the mixture of soluble silicate and pigment to the mineral granules, in order to obtain a reaction between the acidic material and the alkaline portion of the silicate. In some cases, as when zinc chloride, magnesium chloride or aluminum sulphate is used as the insolubilizing agent, the surfaces of the granules are found to be dull, cloudy or to have a white haze, which may be due to the formation of a thin film of zinc or magnesium oxide or hydroxide or of insoluble aluminum hydroxide with a small amount of soluble sodium chloride or sulphate as the end products of the reaction.

An important object of the invention is the production of artificially colored roofing granules having a high intensity of color which are light-fast and resistant to natural weathering, in which the high color strength is obtained by employing lesser amounts of pigments than are customary in conventional practices.

An important feature of our process is that it not only produces brighter or less costly artificially colored granules, but also enables obtaining certain color shades, such as pastels, on the granules, which cannot readily be obtained by conventional methods.

A further important object is the provision of a method of artificially coloring mineral granules colored with heat-sensitive pigment, in which the silicate surface bond is partially insolubilized at relatively high temperatures, e.g. temperatures of 900–1000° F. or higher, which ordinarily would destroy the heat-sensitive pigment.

In a drawing, made a part hereof, a granule prepared according to this invention is schematically illustrated in cross-section.

In accordance with the invention, aritificially colored roofing granules may be produced having a high intensity of color and a wide variety of shades, which in one embodiment thereof may retain the advantages of the high temperature insolubilizing treatment and also gain the extra color strength of heat-sensitive pigments such as phthalocyanine green and iron yellow. The colored coatings have density and permanence and are firmly bonded to the base granule. They are substantially water-insoluble and non-alkaline, and the granules retain their attractive appearance and firm bond to the asphalt stratum of the shingle or siding under severe weather conditions.

These several advantages, both in the process and in the resulting product are obtained by adding part or all of the pigment with the insolubilizing agent to the surface of the roofing granules after the soluble silicate solution has been applied thereto. It has long been thought that it was necessary to apply all of the pigment to the surface of the granules with the soluble silicate solution in order to firmly bond the pigment to the granular surfaces. By applying part or all of the pigment to the granules previously coated with soluble silicate solution, we have made the surprising discovery that the resulting color is brighter than that produced when all of the pigment is mixed, and applied to the granules, with the sodium silicate solution, even though the total pigment quantity remains constant. In this manner the same color intensity may be obtained from a given pigment with the use of approximately 60% of the amount of the same pigment ordinarily used in conventional processes. Furthermore our granules do not have the dull, hazy characteristic of the granules of some of the prior methods.

For example, this desirable result may be obtained by first mixing the granules, that have been cleaned and heated, with an aqueous solution of sodium silicate. The silicate solution may be devoid of pigment or may contain a portion of the total amount of pigment to be employed, depending upon the nature of the pigment or mixture of pigments to be used. The amount of sodium silicate solution employed per ton of granules may vary widely, depending upon whether the granules are dried at low temperatures, e.g. 400° F., or high temperatures of the order of 900–1000° F. If the low temperature is employed the amount of sodium silicate solution, 47° Baumé, should be of the order of 15–35 pounds per ton of granules. When the high temperature process is used the amount of sodium silicate solution employed may be much greater, e.g. of the order of 60 pounds or more.

After the granules are dried and substantially completely dehydrated by heating to temperatures of approximately 400° F. in the low temperature embodiment or to temperatures of the order of 1000° F. in the high temperature embodiment, the solution of insolubilizing agent containing the pigment is added to the granule. The preferred insoblubilizing agent is a mixture of aluminum chloride and ammonium chloride. However, either aluminum chloride or ammonium chloride may be used alone as the insolubilizer. The chlorides are preferably sprayed upon the heated granules as a 10% solution. Other insolubilizing agents such as aluminum sulfate, magnesium chloride, zinc chloride, hydrochloric acid, etc., may be employed but in general most satisfactory results are obtained by using the solution of a mixture of aluminum chloride and ammonium chloride. We have found that small quantities of pigments such as red iron oxide, yellow iron hydrate, titanium dioxide, chrome hydrate, chrome oxide, chrome green, ultramarine blue, phthalocyanine blue and green, carbon black, and indanthrene blue, may be bonded to the granule surface by application with the insolubilizing reagent. In each case the effectiveness of the pigment is increased, producing a stronger color, or permitting a reduction in total pigment content to produce the standard color. Thus artificially colored roofing granules having a high intensity of color in a wide variety of shades may be produced at lower costs than may be obtained in accordance with the methods of the art. In addition, certain high intensity colors and pastel colors not obtainable by conventional methods can be produced by our process. Furthermore the colored coatings are firmly bonded to the base granule and are substantially water insoluble and non-alkaline. The coating adheres well to asphalt roofing.

We are able to use as a base granule any of a rather wide class of relatively porous or non-porous and weather-resistant rock or minerals. Examples of relatively porous material are trap rocks and slates. Examples of relatively non-porous rocks or minerals are argillite or greystone (such as the large greystone deposits located about five miles north of Wausau, Wisconsin), greenstone, certain granites, etc. Normally it is preferred to employ the relatively non-porous rocks, although even these rocks have a substantial porosity as compared with our finished coatings.

Aqueous sodium silicate is the preferred alkali metal silicate, due to its availability and economy, although equivalent materials such as potassium silicate may also be used. The preferred grade of sodium silicate solution is the so-called "K" brand, which has a ratio of $Na_2O$ to $SiO_2$ of 1:2.84, a gravity of 47° Baumé, and a solids content of 40–42%. Variations in the alkalinity of the silicate are permissible, but increased alkalinity raises the requirements of the insolubilizer and may, in some cases, provide a small percentage of undesirable soluble alkali material in the final product, while excessive $SiO_2$ content reduces the film-forming properties, as well as the concentration of the silicate. As mentioned, other brands of sodium silicate solution may be used. When using the "O" brand, slightly smaller amounts of insolubilizer are required to neutralize the granule coating. When using the "D" brand of aqueous sodium silicate, larger amounts of insolubilizer are required.

In preparing artificially colored roofing granules in accordance with a preferred embodiment of the invention, the natural mineral is crushed and screened to the desired size, e.g. so as to pass a "10-mesh" screen and be retained on a "35-mesh" screen. The granules are then heated to a temperature of approximately 110–150° F. and are then mixed with the sodium silicate solution in a suitable mixer, such as an ordinary concrete mixer or other tumbling-barrel type of mixer. A portion of the total pigment content of the surface coating of the artificially colored granules may be applied with the sodium silicate solution in the form of a slurry, or, in some cases, all of the pigment is applied later with the insolubilizer.

The coated granules are then dried, with minimum agitation as, for example, in a rotary kiln, at a temperature above 250° F. but below 600° F., preferably about 400° F., to dehydrate the silicate coating. While the granules are at an elevated temperature of approximately 350° F., the pigment and insolubilizing agent such as an aqueous solution of aluminum chloride or a mixture of aluminum chloride and ammonium chloride are applied to the hot granules, as by spraying. The insoluble pigment may be carried as a suspension in the insolubilizing solution, or the chloride solution and an aqueous pigment suspension may be prepared and applied separately. The granules are then colored and may then be treated with a paraffin oil, linseed oil or any other granule treatment known to the roofing art.

In the high temperature embodiment, the granules are first mixed with a slurry of a sodium silicate solution, a hydrous plastic clay and a portion of the total pigment content. The coated granules are then fired in a rotary kiln to a temperature of about 950°–1000° F. to react the silicate and clay. Subsequently the coated granules are passed through a rotary cooler where cooling water and the remainder of the pigment and a supplemental insolubilizing agent are applied. The pigment may be suspended in the insolubilizing solution or a separate aqueous suspension of the pigment may be prepared and applied.

The following preferred formulae have been satisfactorily employed for the production of artificially colored roofing granules and illustrate several suitable compositions for the coating of roofing granules within the scope of our invention.

| Formula No. 1—Green: | Lbs. |
| --- | --- |
| Granules | 2000 |
| Chromium oxide | 10 |
| Phthalocyanine Green, 20% paste | [1] 16 |
| Yellow iron hydrate | 1.2 |
| Wetting agent | 0.2 |
| "K" brand sodium silicate solution, 47° Baumé | 30 |
| Water | 3 |
| Insolubilizing solution and pigment: | |
| Aluminum chloride solution | [1] 2.0 |
| Ammonium chloride solution | [1] 2.0 |
| Phthalocyanine Green | [1] 16 |

[1] Solids.

In coating one ton of granules according to the above formula, the following procedure may be satisfactorily employed. A slurry of the pigments, a wetting agent preferably comprising an anionic surface-active agent such as sulfoxy derivatives of hydrocarbons, and sodium silicate solution is first made and is coated on the granules in a suitable mixer such as a tumbling-barrel type of mixer. The granules are fed into the mixer at 110°–150° F. and the mixing is continued until the granules are uniformly coated with the slurry. Air is circulated through the mixer to dry the granules; the partial drying may require five to ten minutes. The granules are then fired, preferably in a rotary kiln at a temperature of 350°–400° F., which temperature is normally maintained for from about five to twenty minutes depending upon the size of the kiln and other factors to dehydrate the silicate coating.

The granules are then fed into a cooler, for example, a rotary tube type of cooler. As the hot granules start through the cooler, the remainder of the pigment and an insolubilizer solution, as set forth in the above formula, are applied to the granules. In the above example, it will be noted that half of the heat-sensitive pigment content (in this example phthalocyanine green) is applied to the granules with the silicate binder solution and the other half with the insolubilizing agent. This ratio may be varied considerably, and all of the heat-sensitive pigment may be applied with the insolubilizing agent, as in Formula No. 2. The residual heat in the granules is at this point more than sufficient to evaporate the water thus added and also to remove any ammonia liberated from the ammonium chloride in solutions including ammonium chloride. The temperature of the granules at the discharge end of the cooler is in the order of 200° F. As previously mentioned, the insoluble pigment may be carried as a suspension in the solution of aluminum chloride and ammonium chloride, or the chloride solution and an aqueous pigment suspension may be prepared and applied separately. The granules are then oiled for the purpose of increasing their adherence to asphalt in the presence of water.

It may be desirable to omit the yellow iron hydrate from the above formula and add a small amount of ferric chloride, e.g., about 1.5 pounds solids, to the aforenoted insolubilizing solution and pigment suspension used to treat the granules after dehydration of their sodium silicate coating. The addition of small amounts of ferric chloride with this insolubilizing treatment has been noted to produce green colors similar to or brighter than those produced with yellow iron hydrate in the mixer formula.

We have found that ferric chloride, added in aqueous solution with the insolubilizer and pigment suspension, reacts with our dehydrated sodium silicate coatings to produce in situ a yellow iron hydrate on the granule surfaces. Thus, ferric chloride may be used as here described in combination with color pigments to provide granules of various colors including the lighter and pastel shades.

The following formula may be used for the preparation of green granules in which all of the heat-sensitive green pigment is applied with the insolubilizing solution:

Formula No. 2—Green: Lbs.
 Granules _____ 2000
 Chrome oxide _____ 10.0
 Yellow iron hydrate _____ 1.0
 "K" brand sodium silicate solution, 47° Baumé _____ 30.0
 Water _____ 3.0

Insolubilizing solution and pigment:
 Aluminum chloride solution _____ [1] 2.0
 Ammonium chloride solution _____ [1] 2.0
 Phthalocyanine Green _____ [1] 0.2

[1] Solids.

The coating composition and insolubilizer solution and pigment may be prepared and coated on roofing granules in accordance with the method described in connection with Formula No. 1.

The following formula is illustrative of a composition that may be employed to produce a green granule in which all of the pigment is applied with the insolubilizing agent.

Formula No. 3—Green: Lbs.
 Granules _____ 2000
 "K" brand sodium silicate solution, 47° Baumé _____ 30.0
 Water _____ 3.0

Insolubilizing agent and pigment:
 Aluminum chloride solution _____ [1] 2.0
 Ammonium chloride solution _____ [1] 2.0
 Phthalocyanine Green _____ [1] 0.6
 Yellow iron hydrate _____ 1.0

[1] Solids.

The coating composition and insolubilizing solution and pigment may be prepared and applied to the roofing granules in accordance with the 2-step method described in connection with Formula No. 1.

The following formula is illustrative of the coating compositions that may be employed in the high temperature embodiment previously mentioned, in which the heat-sensitive pigment (in this example yellow iron hydrate) is applied with the insolubilizing solution:

Formula No. 4—Cream buff: Lbs.
 Granules _____ 2000
 Titanium dioxide _____ 50.0
 Kaolin _____ 20.0
 "K" brand sodium silicate solution, 47° Baumé _____ 60.0
 Water _____ 20.0

Insolubilizing solution and pigment:
 Aluminum chloride solution _____ [1] .75
 Ammonium chloride solution _____ [1] .75
 Yellow iron hydrate _____ 2.0
 Red iron oxide _____ 0.2

[1] Solids.

As in the method previously described, a slurry of titanium dioxide, kaolin and sodium silicate solution is first prepared and applied to the granules in a mixer of the type described. The granules and slurry are mixed for several minutes until the granules are evenly coated, and then they are dried with a warm air blast until they are of a free-flowing consistency. The coated granules are then fired in a rotary kiln to a temperature of about 950°–1000° F. to react the silicate and clay.

The granules are then fed into a cooler where the insolubilizer solution of aluminum chloride and ammonium chloride and the pigments are added. The insolubilizer solution neutralizes the portion of the soda content of the silicate that has not reacted with the kaolin. The residual heat in the granules is at this point more than sufficient to evaporate the water thus added and also to remove any ammonia liberated from the ammonium chloride solution. As in the process described in connection with Formula No. 1, the pigments may be suspended in the chloride solution or a separate aqueous suspension of the pigments may be prepared. The temperature of the granules at the discharge end of the cooler is likewise about 200° F.

A pastel pink granule may be obtained by omitting the yellow iron hydrate from the coating composition of Formula No. 4. Other pastel colors such as green, yellow, etc. can be produced in like manner by adding small amounts of the following pigments with the insolubilizing agent to a granule previously coated white with titanium dioxide. We have used amounts of pigment as low as the following and found them to be effective in obtaining pastel shades:

Phthalocyanine green ____ 0.04 lb. (solids) per ton of granules.
Red iron oxide _____ 0.1 lb. (solids) per ton of granules.
Yellow iron hydrate _____ 0.1 lb (solids) per ton of granules.

The quantity of pigment required for pastel granules depends on the color strength desired, and it is possible under certain circumstances that even the foregoing small amounts may be reduced.

It is to be understood that pigments other than those specifically mentioned in the foregoing formulae may be employed. Other brands of sodium silicate solution, or a potassium silicate solution, may be employed in place of the "K" brand sodium silicate solution specified in the examples. Likewise, the ammonium chloride content may be omitted from the insolubilizing solution, in which case the aluminum chloride content is increased correspondingly.

Asphalt shingles surfaced with granules coated in accordance with the foregoing coating compositions have been exposed to the weather at St. Paul, Minnesota, and at Houston, Texas, for periods of two years or longer and have been found to have a strongly bonded, weather-resistant coating that is essentially neutral and has a low soluble salt content.

Thus we are able to produce artificially colored granules in which a portion or all of the pigment is applied to the granule surfaces after the sodium silicate bond has been applied thereto and dehydrated. Contrary to expectation the pigment is adequately bonded to the granule. Equally surprising is the fact that the color intensity of such granules is substantially greater than the color intensity of granules in which all of the pigment is applied with the sodium silicate bond. Thus we are able to obtain the same color brightness as is obtained in the prior methods in which all of the pigment is applied with the bond, by applying a portion or all of a reduced amount of pigment, such as 40–50% less pigment, with the insolubilizing agent. While it is difficult to theorize as to the reasons for this highly desirable result, it may well be that the pigment, applied with the insolubilizing agent, acts in the nature of a "lake" on the granule surface, much as insoluble lakes are formed with certain organic dyestuffs in which aluminum hydroxide is used as a mordant. There is also a possibility that the pigment is held in place to some extent by the silicic acid formed by neutralization of the sodium silicate. This theory may explain the elimination of objectionable white or gray haze of aluminum hydroxide, and of zinc or magnesium oxide or hydroxide which is not found in granules prepared in accordance with the methods herein described. Likewise we are able to bond heat-sensitive pigments to granules coated by high temperature methods.

It is apparent that the improved coating processes may be used for the surface coating of many types of granules or other objects. Granules, tiles or slabs, such as asbestos-cement compositions or other flat preformed calcinable lithic cement slabs may similarly be given an insoluble, well-bonded, neutral, inorganic surface-coating by application of all or a portion of the pigment with the insolubilizing treatment. In this manner the effectiveness of the pigment is increased, producing a stronger color, or permitting a reduction in total pigment content to produce a standard color.

That which is claimed is:

1. The method of coloring granules of the character described which comprises applying a coating of a hydrous plastic clay, a pigment in an amount insufficient to provide the desired color intensity in the granule coating and sodium silicate, reacting said clay and silicate at temperatures of the order of 950°–1000° F., and applying directly upon the outer surface of said clay-silicate coating, a composition consisting of additional pigment and a solution of the compound adapted to complete the neutralization of the soda content of said coating, to thereby bond said additional pigment on the outer surface of said clay-silicate coating by a material consisting of products of the chemical neutralization of said underlying coating.

2. The method as defined in claim 1 in which the second mentioned pigment is a pigment adapted to be damaged at temperatures above 600° F.

3. The method of applying a colored coating to the surface of mineral granules comprising coating the granules with a fluid film-forming composition comprising a pigment in an amount insufficient to provide the desired color strength in the granule coating and an aqueous solution of sodium silicate, dehydrating the silicate solution by heating the granules, then spraying an aqueous mixture upon the granules while they are at a temperature of the order of at least 200° F., the ingredients in said aqueous mixture consisting essentially of a dissolved chemical insolubilizing agent for said underlying dehydrated sodium silicate coating and a suspended pigment, and then drying the granules, said pigment applied with said insolubilizing agent being bonded on the outer surface of said underlying silicate coating by a material consisting of products of the chemical insolubilization of said underlying coating.

4. The method of artificially coloring granules in the manufacture of roofing granules comprising coating the surface of the granules with an aqueous solution of sodium silicate, heating the coated granules to temperatures of the order of 400° F., and then applying a mixture consisting essentially of a pigment and an insolubilizing solution comprising one or more members of the group consisting of aluminum chloride, ammonium chloride, aluminum sulfate, magnesium chloride, zinc chloride and hydrochloric acid while the granules are at a temperature of the order of 200° F.

5. The method of applying a colored coating to the surface of mineral granules in the manufacture of roofing granules which comprises coating the surface of the granules with a film-forming composition consisting essentially of an aqueous solution of sodium silicate, substantially dehydrating said silicate solution by heating the granules, and then applying a suspension consisting essentially of a pigment and a neutralizing solution to the surface of the coated granules while the granules are hot, said solution consisting of a mixture of aluminum chloride and ammonium chloride.

6. The method of artificaly coloring granules in the manufacture of roofing granules comprising coating the surface of the granules with an aqueous solution of sodium silicate, dehydrating the silicate coating by heating the granules, and then treating the dehydrated silicate coating of the granules while said granules are at a temperature of the order of at least 200° F. with an aqueous solution of an insolubiling agent for said sodium silicate coating, said insolubilizing solution including a pigment in suspension and a small amount of ferric chloride at least sufficient to react with the dehydrated sodium silicate coating of said granules to form a yellow iron hydrate.

7. As a new article of manufacture: a non-hazy artificially colored roofing granule comprising a mineral base granule having a pigmented insolubilized silicate coating thereon, and an organic heat-sensitive pigment bonded to the outer surface of said silicate coating in an amount providing much more intense pigmentation on the surface than in the interior and underlying portions of said silicate coating, said heat-sensitive pigment being bonded on the surface of said underlying insolubilized silicate coating by an insoluble material consisting of products of the chemical insolubilization of said underlying silicate coating.

8. As a new article of manufacture: a non-hazy artificially colored roofing granule comprising a mineral base granule having a chrome oxide green pigmented insolubilized silicate coating thereon and a concentration of phthalocyanine green pigment on the surface of said coating in an amount providing much more intense pigmentation on the surface than in the interior and underlying portions of said coating, said phthalocyanine green pigment being bonded on the surface of said underlying insolubilized silicate coating by an insoluble material consisting of products of the chemical insolubilization of said underlying silicate coating.

9. As a new article of manufacture: a non-hazy artificially green colored roofing granule comprising a mineral base granule having a chrome oxide green pigmented insolubilized silicate coating thereon and a concentration of a phthalocyanine green pigment on the surface of said coating in an amount providing the surface of said coating with much more intense pigmentation than the interior and underlying portions thereof, said coating comprising a substantially insoluble non-blooming inorganic silicate resulting from the insolubilizing of sodium silicate, and said phthalocyanine green pigment being bonded to said underlying insolubilized silicate coating by an insoluble material consisting of products of chemical insolubilization of said underlying silicate coating.

10. Non-hazy artificially green colored, coated roofing granules having intense green surface coloration and relatively weaker underlying coloration in the coating thereof, said roofing granules comprising a mineral base granule coated with well-bonded, substantially non-alkaline insolubilized silicate binder material, and a green color pigment firmly bonded to the outer surface of said insolubilized silicate binder material, said color pigment being in substantially greater concentration on the surface portions of said underlying insolubilized silicate coating as compared to its concentration in the interior and underlying portions of said silicate coating, said color pigment on surface portions of said silicate coating being bonded to said underlying insolubilized silicate coating by an insoluble material consisting of products of the chemical insolubilization of said underlying silicate coating.

11. A method of artificially coloring granules in the manufacture of roofing granules comprising applying upon the surface of mineral granules a coating of a hydrous plastic clay and sodium silicate, reacting said clay and silicate at temperatures on the order of 950°–1000° F., and then applying a mixture consisting of a pigment and an insolubilizing solution comprising one or more members of the group consisting of aluminum chloride, ammonium chloride, aluminum sulfate, magnesium chloride, zinc chloride and hydrochloric acid while the granules are at a temperature at least on the order of 200° F., thereby to bond said pigment applied with said insolubilizing solution directly upon the outer surface of said underlying clay-silicate coating.

12. The method of aplying a colored coating to the surface of mineral granules in the manufacture of roofing granules which comprises coating the surface of the granules with a film-forming composition consisting essentially of an aqueous solution of sodium silicate, substantially dehydrating said silicate solution by heating the granules, and then applying a suspension consisting essentially of a pigment and a neutralizing solution to the surface of the coated granules while the granules are hot, said solution comprising one or more members of the group consisting of aluminum chloride, ammonium chloride, aluminum sulfate, magnesium chloride, zinc chloride, and hydrochloric acid.

13. Non-hazy artificially colored roofing granules comprising a mineral base granule havin ga pigmented insolubilized silicate coating thereon and a color pigment firmly bonded to the outer surface of said silicate coating in an amount provided much more intense pigmentation on the surface than in the interior and underlying portions of said silicate coating, said color pigment on the surface portions of said silicate coating being bonded to said underlying insolubilized silicate coating by an insoluble material consisting of products of the chemical insolubilization of said underlying silicate coating.

14. Non-hazy artificially colored roofing granules comprising a mineral base granule having a clay-silicate coating thereon and a heat-sensitive color pigment firmly bonded to the outer surface of said clay-silicate coating, said heat-sensitive color pigment on the surface of said clay-silicate coating being bonded to said underlying clay-silicate coating by an insoluble material consisting of reaction products of chemical insolubilization of silicate in said underlying clay-silicate coating.

References Cited in the file of this patent

UNITED STATES PATENTS

| Number | Name | Date |
|---|---|---|
| Re. 19,372 | Walton | Nov. 13, 1934 |
| 1,898,345 | Denning | Feb. 21, 1933 |
| 1,939,930 | Small | Dec. 19, 1933 |
| 2,003,849 | Alton | June 4, 1935 |
| 2,142,540 | Veazey | Jan. 3, 1939 |
| 2,163,678 | Gundlach | June 27, 1939 |
| 2,379,358 | Jewett | June 26, 1945 |
| 2,422,927 | Reynolds | June 24, 1947 |
| 2,553,604 | Pole | May 22, 1951 |
| 2,591,149 | Grove | Apr. 1, 1952 |
| 2,614,051 | Buzzell et al. | Oct. 14, 1952 |